Inventor:
John A. Kochan,
by John M. Staudt
Attorney.

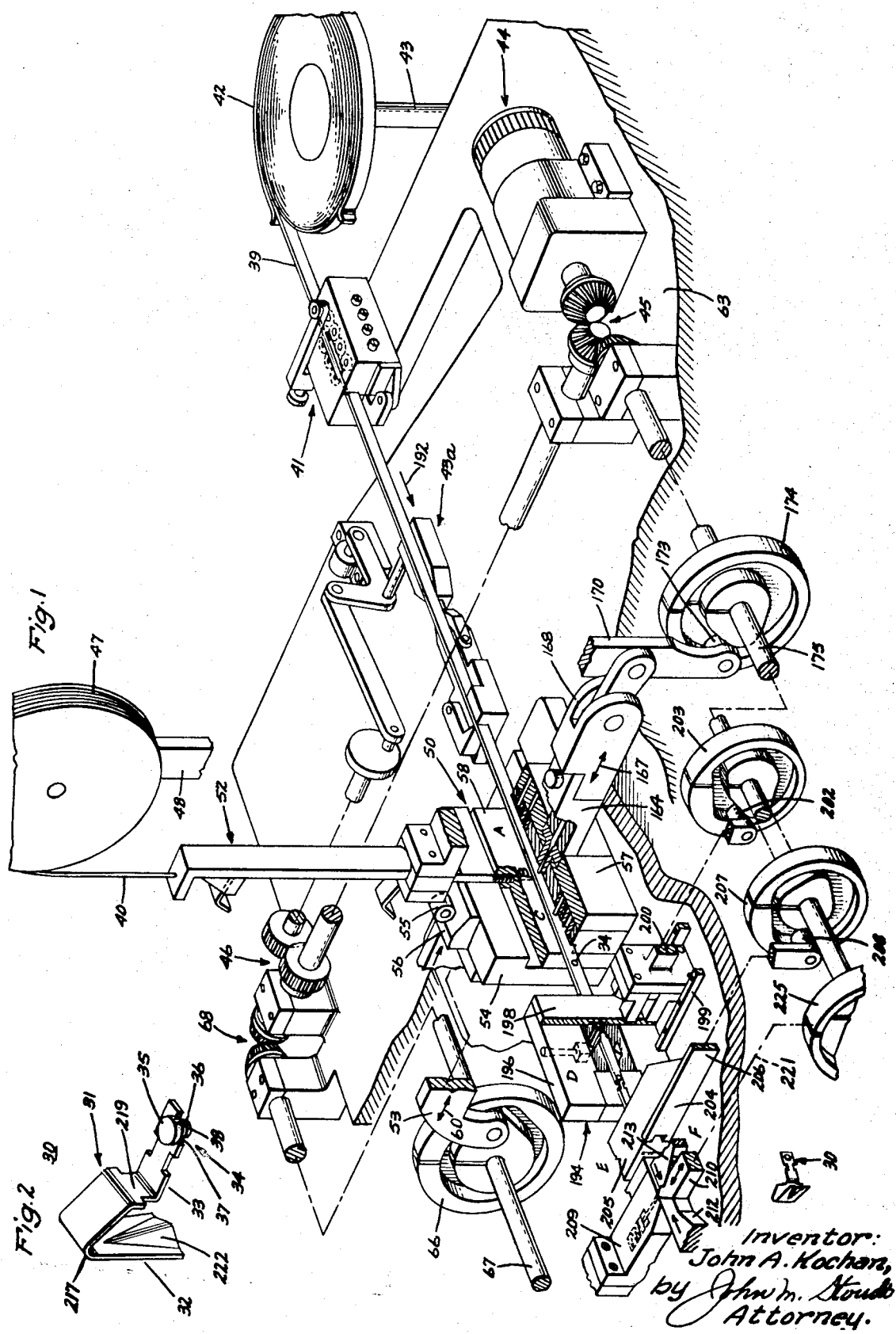

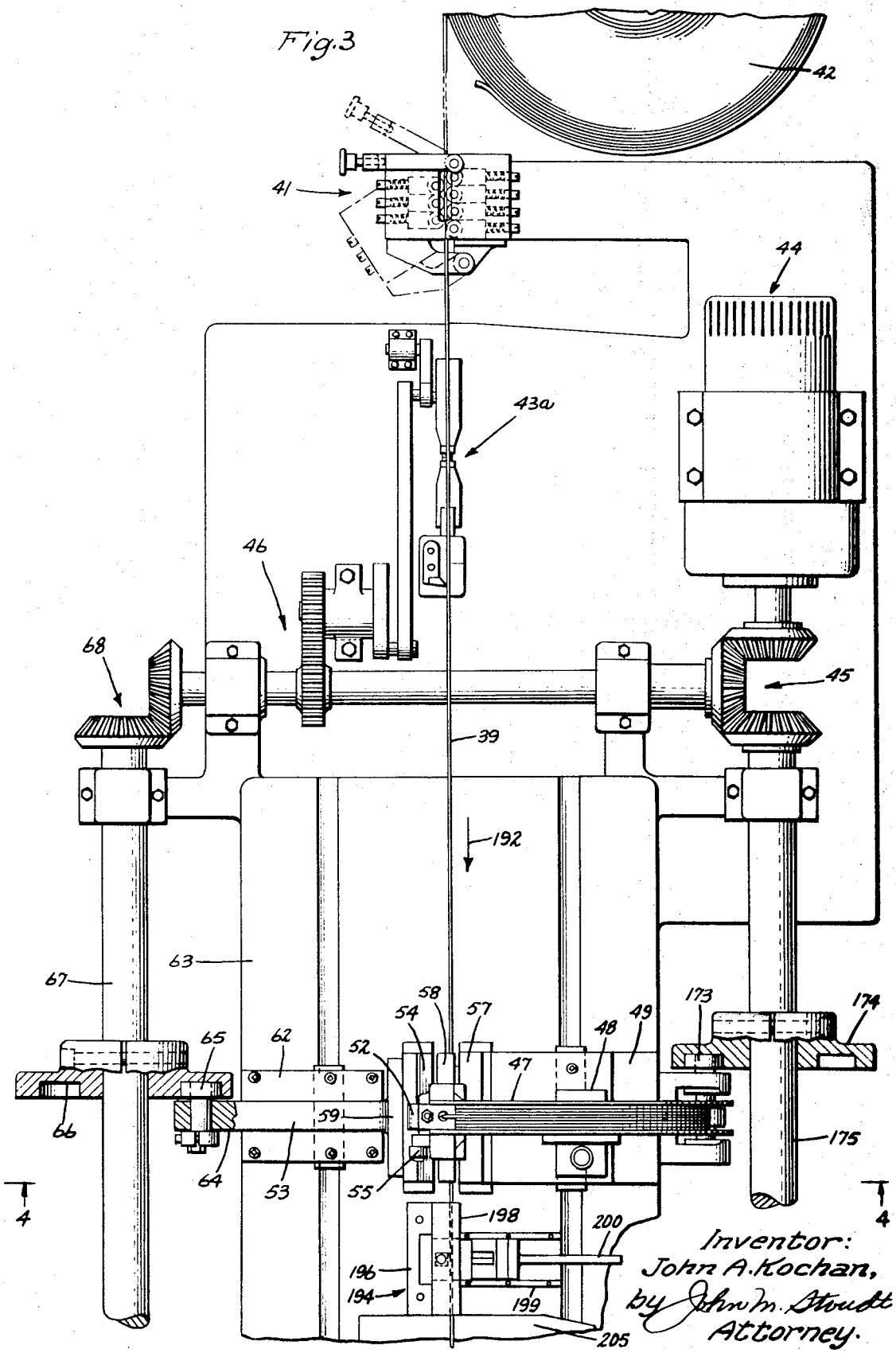

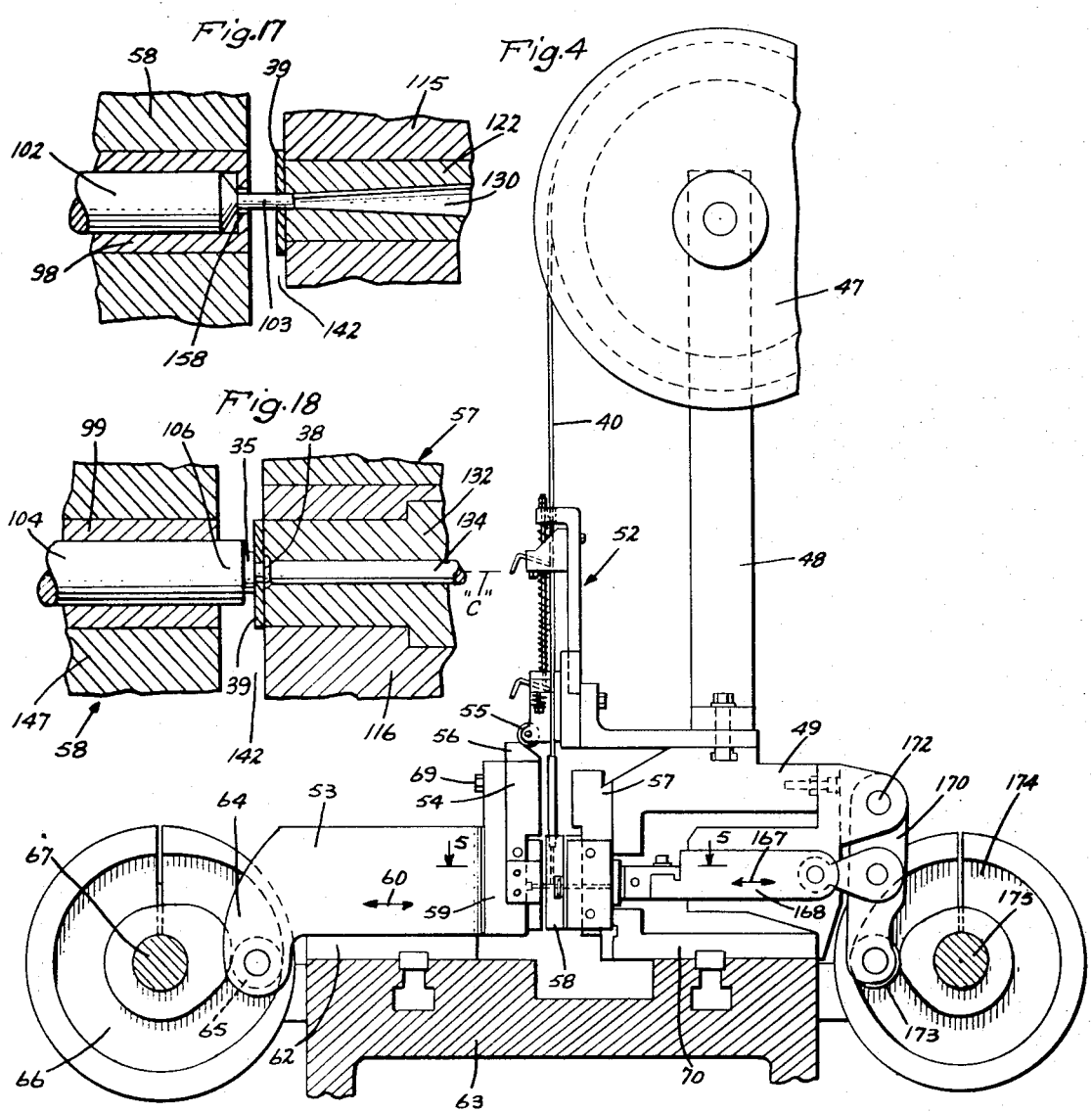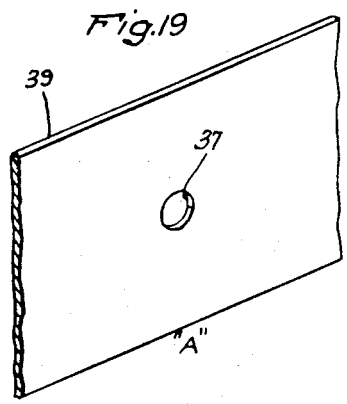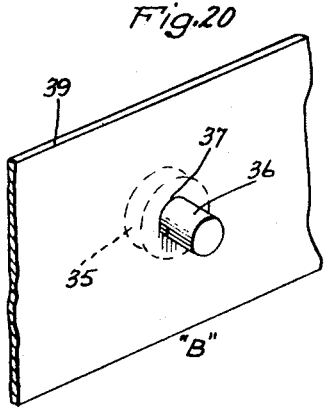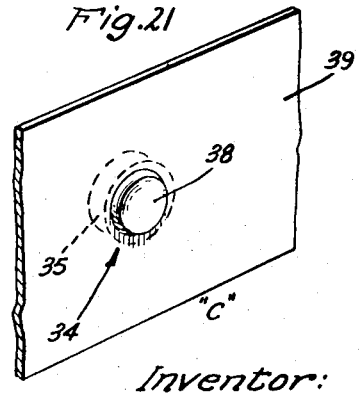

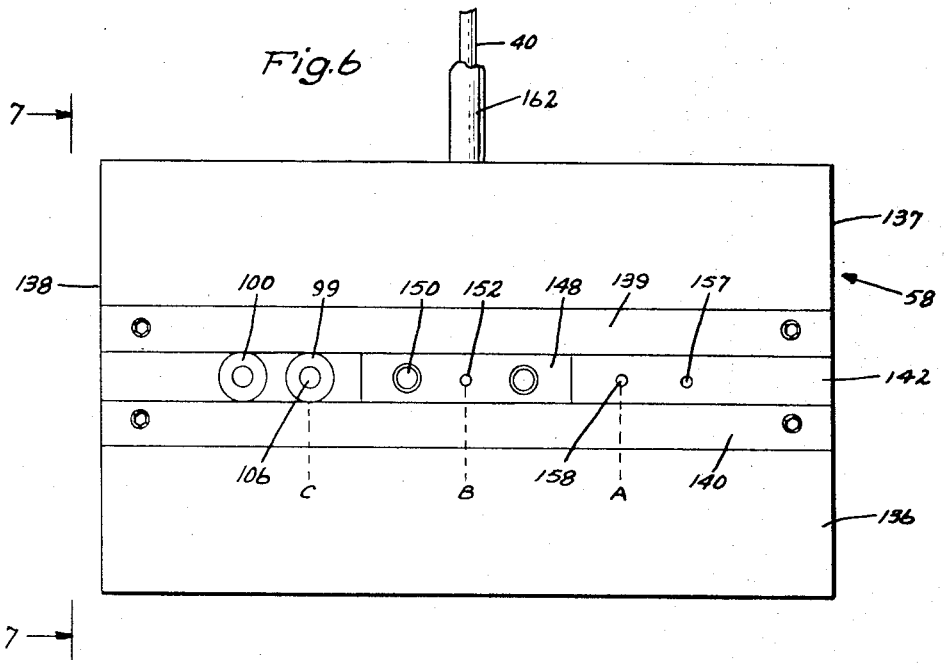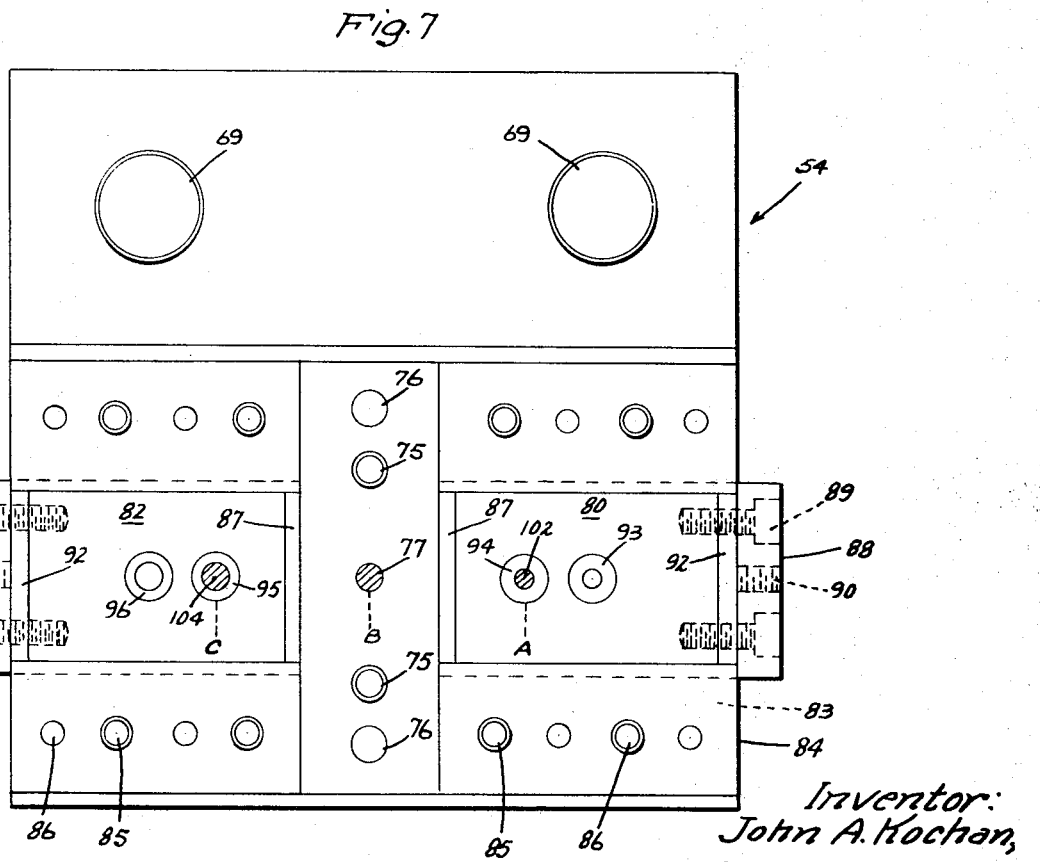

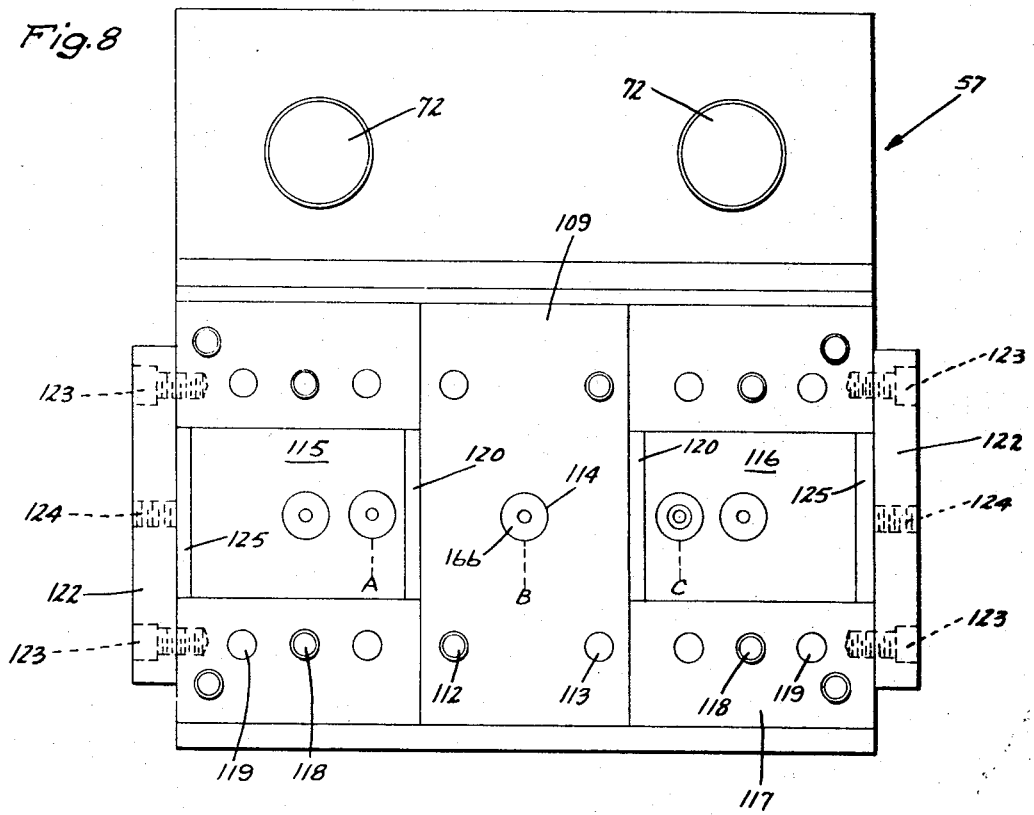
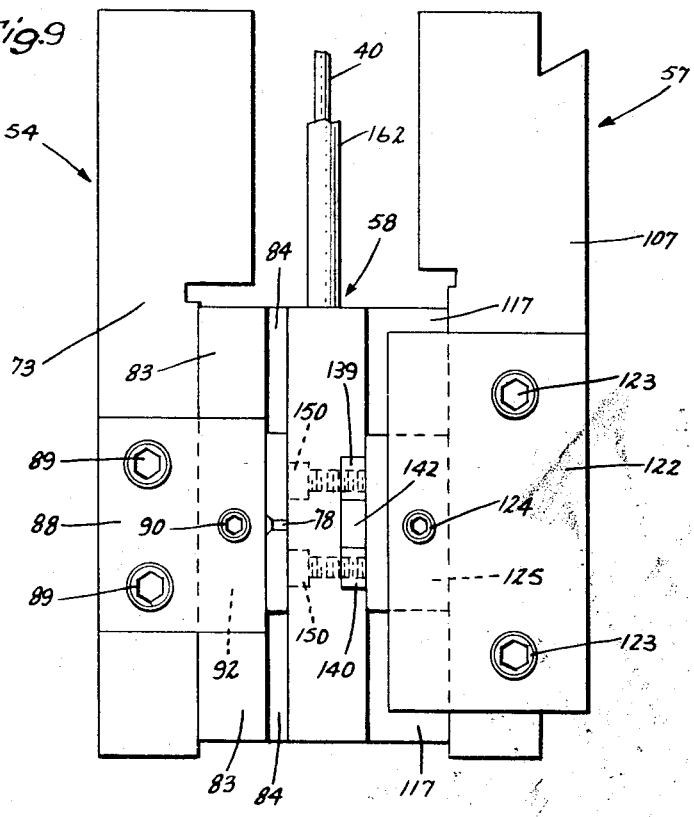

Nov. 3, 1970     J. A. KOCHAN     3,537,162
APPARATUS FOR ATTACHING CONTACTS TO ELECTRICALLY
CONDUCTIVE ELEMENTS
Original Filed March 7, 1966     8 Sheets-Sheet 7
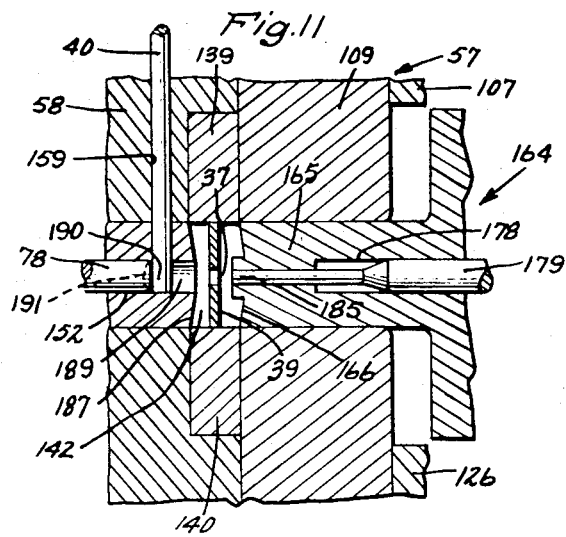
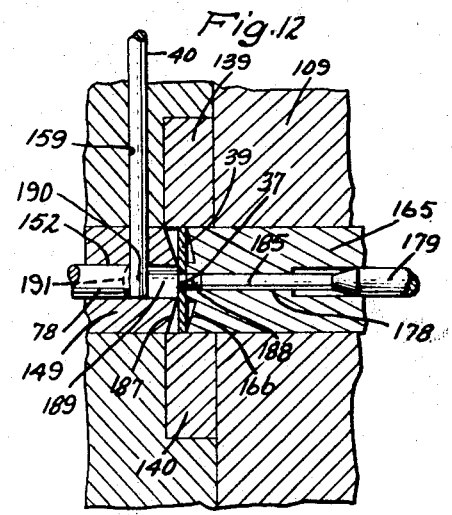
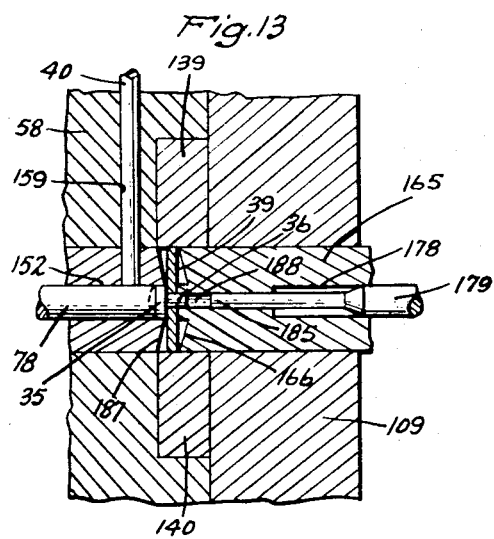
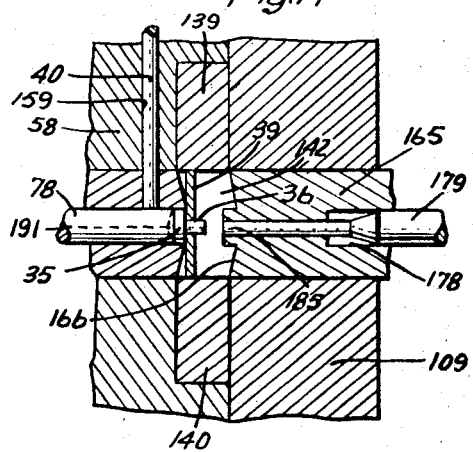
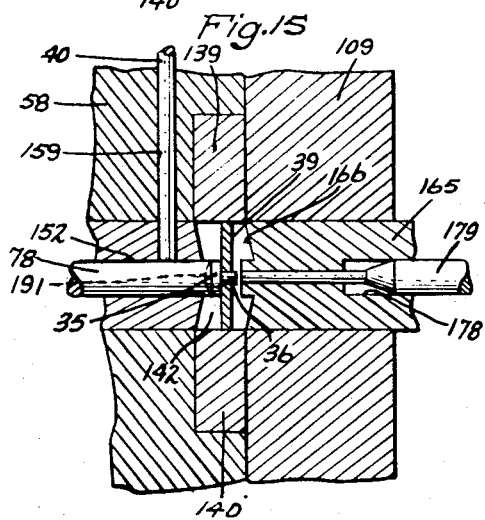
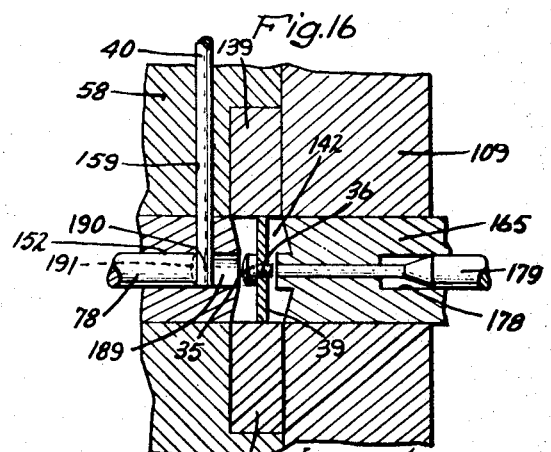
Inventor:
John A. Kochan,
by John M. Stoudt
Attorney.

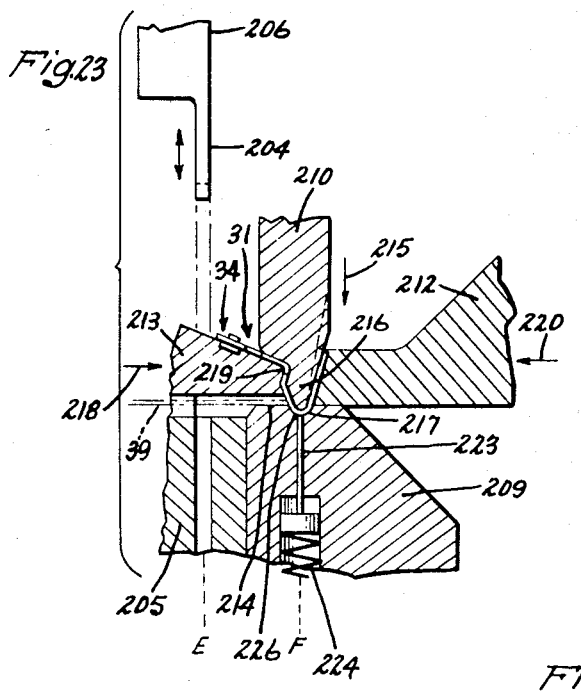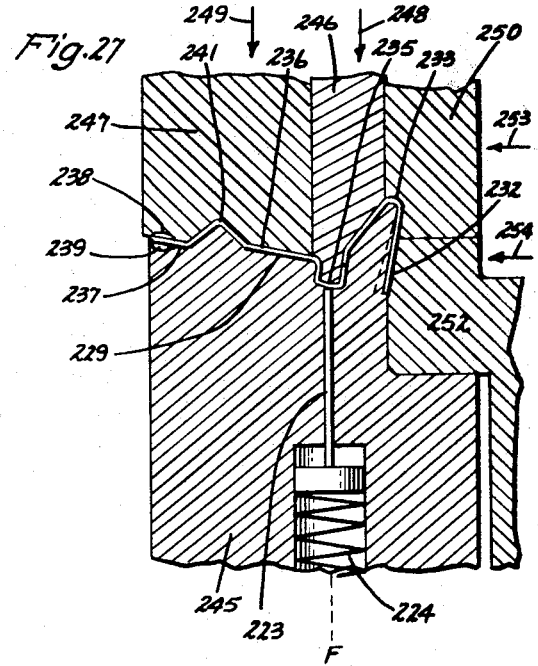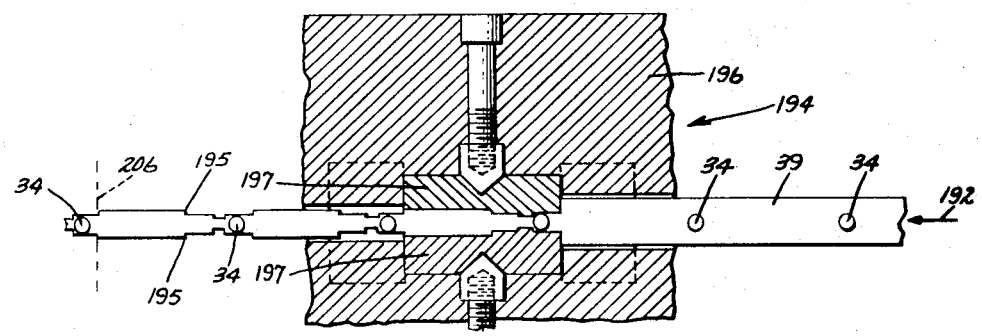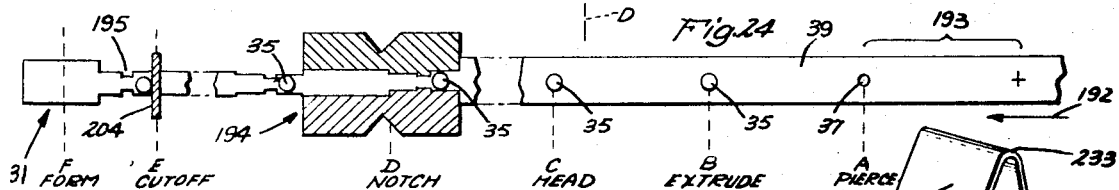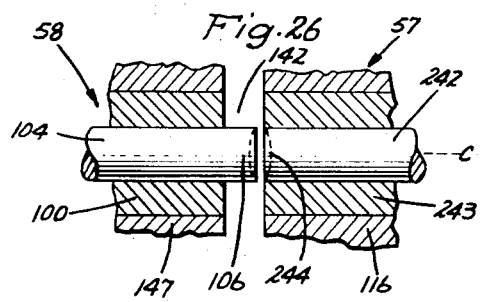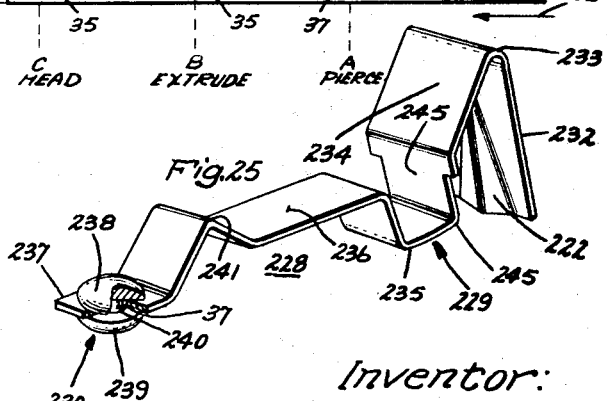

United States Patent Office 3,537,162
Patented Nov. 3, 1970

3,537,162
APPARATUS FOR ATTACHING CONTACTS TO ELECTRICALLY CONDUCTIVE ELEMENTS
John A. Kochan, Fairfield, Conn., assignor to General Electric Company, a corporation of New York
Original application Mar. 7, 1966, Ser. No. 532,310. Divided and this application Oct. 21, 1968, Ser. No. 769,066
Int. Cl. H01h 11/04
U.S. Cl. 29—33
11 Claims

ABSTRACT OF THE DISCLOSURE

Apparatus for forming electric contact elements includes successive stations for punching holes in a strip of conductive material, forming a contact at and extruding contact material through each hole, heading each contact, severing the strip into sections and forming each section into individual contact elements. At the contact-forming work station the strip is brought between a stripper plate and a die, having openings aligned with the hole in the strip. The die is moved forward to clamp the strip against the stripper plate. A plunger in the stripper plate opening then is moved forward, severing a slug of contact-forming material from the end of a continuous rod of such material, forming a contact against one side of the strip and extruding part of the contact-forming material through the hole and into the opening in the die. The die then is retracted and a stationary pin mounted in the die opening forces the extruded material out of the die opening. The plunger then is moved forward again to force the contact from the stripper plate opening.

Cross-reference to related application

This application is a division of my copending application Ser. No. 532,310, filed Mar. 7, 1966.

Background of the invention

This invention relates generally to apparatus for attaching contacts to electrically conductive switch elements such as those employed in electric switches, circuit breakers, and the like, and more particularly to an improved apparatus and method for continuously and automatically forming switch elements having contacts attached thereto.

Switching devices normally include electrically conductive current carrying switch elements formed by blades of relatively thin conductive metal such as copper, brass or Phosphor bronze, and mounting contacts conventionally having exposed silver contact surfaces. The exact overall configuration of the switch element blades, the type and size of contacts utilized, i.e., whether single or double headed with flat or rounded contact surfaces, and the precise location of the contacts on the blades are structural variances dictated by the specific function of the switch element and the application of the switching device in which it is incorporated.

In the past such contacts have been attached to the switch element blade in a separate attaching operation either prior to or following formation of the blades into the desired configuration. Pat. No. 3,034,641 of the present applicant and assigned to the assignee of the present application discloses punch press apparatus for attaching silver contacts by extrusion to a strip of relatively thin conductive switch element material and is representative of this approach. The preliminary piercing operation and subsequent rehitting or heading, notching, forming and cutting operations in such prior approaches are generally performed as separate operations in other apparatus. In addition, the approaches were inherently limited as to the type of switch element, including contact shape and location, which could be furnished thereby.

It is therefore desirable to provide an apparatus for continuously and automatically forming finished switch elements with contacts attached thereto with all of the requisite steps being sequentially performed in the same apparatus and which does not require the use of springs. Multi-slide stamping machines have been employed for the high speed production of parts formed from thin metal, such machines using cam motion for all of the operations including timing and stripping. It is accordingly further desirable to adapt a high speed stamping machine of the multi-side type to the continuous and automatic fabrication of finished switch blades having contacts attached thereto. It is also desirable that the foregoing be achieved by an economical yet versatile arrangement capable of producing a number of different types of switch elements.

Summary of the invention

It is accordingly an object of the invention to provide improved apparatus for forming electrically conductive elements having contacts attached thereto.

Another object of the invention is to provide improved apparatus for attaching contacts to electrically conductive switch elements.

A still further object of the invention is to provide an improved apparatus for continuously and automatically, and at high speed forming finished switch blade elements having contacts attached thereto, the improved apparatus effecting the desirable features mentioned above.

In accordance with one embodiment of the present invention there is provided apparatus for forming electrically conductive elements. The apparatus includes a die block and a stripper plate in juxtaposed relationship to form a cavity for receiving a strip of relatively thin conductive material having a hole therein; the die block and stripper plate being spaced apart a distance substantially greater than the thickness of the strip.

A die is movably mounted in the die block and means are provided for moving the die between a retracted and a forward position. In its forward position, the die extends into the cavity to clamp the portion of the strip adjacent the hole therein between the die and the stripper plate. In its retracted position, the die is spaced substantially from the stripper plate to release the strip.

The die has a first longitudinal opening therein, which is in alignment with the hole in the strip when the die clamps the strip. A stationary stripping pin is mounted in the first longitudinal opening so as to be withdrawn from the cavity end of the die when the die is in its forward position and to be flush with the cavity end of the die when the die is in its retracted position.

The stripper plate has a second longitudinal opening therein. The second longitudinal opening is in alignment with the hole in the strip when the die clamps the strip and has a larger cross-sectional area than the hole in the strip. A plunger is movably mounted in the second longitudinal opening and means are provided for moving the plunger between a retracted position, removed substantially from the cavity end of the second longitudinal opening; an intermediate position, spaced slightly from the cavity end of the second longitudinal opening; and a forward position, at least in alignment with the cavity end of the second longitudinal opening. Means are provided for introducing a slug of contact-forming material into the second longitudinal opening when the plunger is in its retracted position.

Means are provided interconnecting the die moving means and the plunger moving means whereby the die is moved to its forward position to clamp the strip; then the plunger is moved from its retracted to its intermediate position to form a contact adjacent one side of the strip and to extrude some contact-forming material through the hole in the strip into the first longitudinal opening; and then the die is moved to its retracted position and the plunger is moved to its forward position so that the stripper pin removes the extruded contact-forming material from the first longitudinal opening and the plunger removes the contact from the second longitudinal opening.

Brief description of the drawings

The above-mentioned and other features and objects of the invention and the manner of attaining them will become more apparent and the invention itself will be best understood by reference to the following description of an embodiment of the invention taken in conjunction with the accompanying drawings, wherein:

FIG. 1 is a fragmentary view in perspective, partly broken away and partly schematic, of one embodiment of the invention which reveals the step by step progressive in-line fabrication of finished switch blade elements having contacts attached thereto from a continuous length of electrically conductive strip material;

FIG. 2 is an enlarged view in perspective, partly broken away, of the electrically conductive switch element having a single-headed contact which is fabricated by the apparatus of FIG. 1 and which is typical of the switch elements which may be fabricated by the apparatus and method of the invention;

FIG. 3 is a top plan view of a part of the apparatus shown in FIG. 1 illustrating the feeding of electrically conductive strip material from a strip storage drum into the contact-forming and attaching mechanism of the invention;

FIG. 4 is a fragmentary, cross-sectional view taken along the line 4—4 of FIG. 3;

FIG. 6 is a view of the front surface of the stripper plate of the contact-forming and attaching mechanism of the invention as viewed along the line 6—6 of FIG. 5;

FIG. 7 is a view of the front surface of the punch block of the contact-forming and attaching mechanism of the invention as viewed along the line 7—7 of FIG. 5;

FIG. 8 is a view of the front surface of the die block of the contact-forming and attaching mechanism of the invention as viewed along the line 8—8 of FIG. 5;

FIG. 9 is an end view of the die block, stripper plate and punch block viewed generally along the line 9—9 of FIG. 5;

FIGS. 11 through 16 are fragmentary, cross-sectional, enlarged views taken generally along the same line as FIG. 10 and illustrating the steps involved in the formation and attachment of a contact to the electrically conductive strip;

FIG. 17 is an enlarged, fragmentary, cross-sectional view showing a part of the mechanism at position A of FIGS. 1 and 5 piercing a hole in the strip material;

FIG. 18 is a fragmentary, enlarged, cross-sectional view showing a part of the contact-forming and attaching mechanism at position C of FIGS. 1 and 5 sizing or heading the contact to complete its attachment to the strip;

FIG. 19 is a fragmentary, enlarged view in perspective showing the strip after a hole has been pierced therein at position A;

FIG. 20 is a fragmentary view in perspective showing the contact and its extruded shank portion resulting from the extruding step performed at position B as a result of the steps shown in FIGS. 11 through 16 inclusive;

FIG. 21 is a fragmentary, enlarged view in perspective showing the final contact attached to the strip by the heading operation performed at position C;

FIG. 22 is a fragmentary, cross-sectional view showing the notching mechanism of the invention located at position D in FIG. 1;

FIG. 23 is a fragmentary, cross-sectional view showing the severing mechanism located at position E in FIG. 1 and the bending or forming mechanism located at position F in FIG. 1 which forms the specific switch element shown in FIG. 1;

FIG. 24 is a fragmentary, plan view of the strip material illustrating the various steps of operation that are performed thereon as it progresses through the apparatus of FIGS. 1 through 23;

FIG. 25 is a perspective view, partly broken away, showing another form of electrically conductive switch element having a double-headed contact which may be fabricated by the apparatus and method of the invention;

FIG. 26 is a fragmentary, enlarged, cross-sectional view of the contact-forming and attaching mechanism at position C for heading the contact of the switch element of FIG. 25; and FIG. 27 is a fragmentary, cross-sectional view showing the bending or forming apparatus at position F for forming the switch element of FIG. 25.

Description of the preferred embodiments

Figure 5:
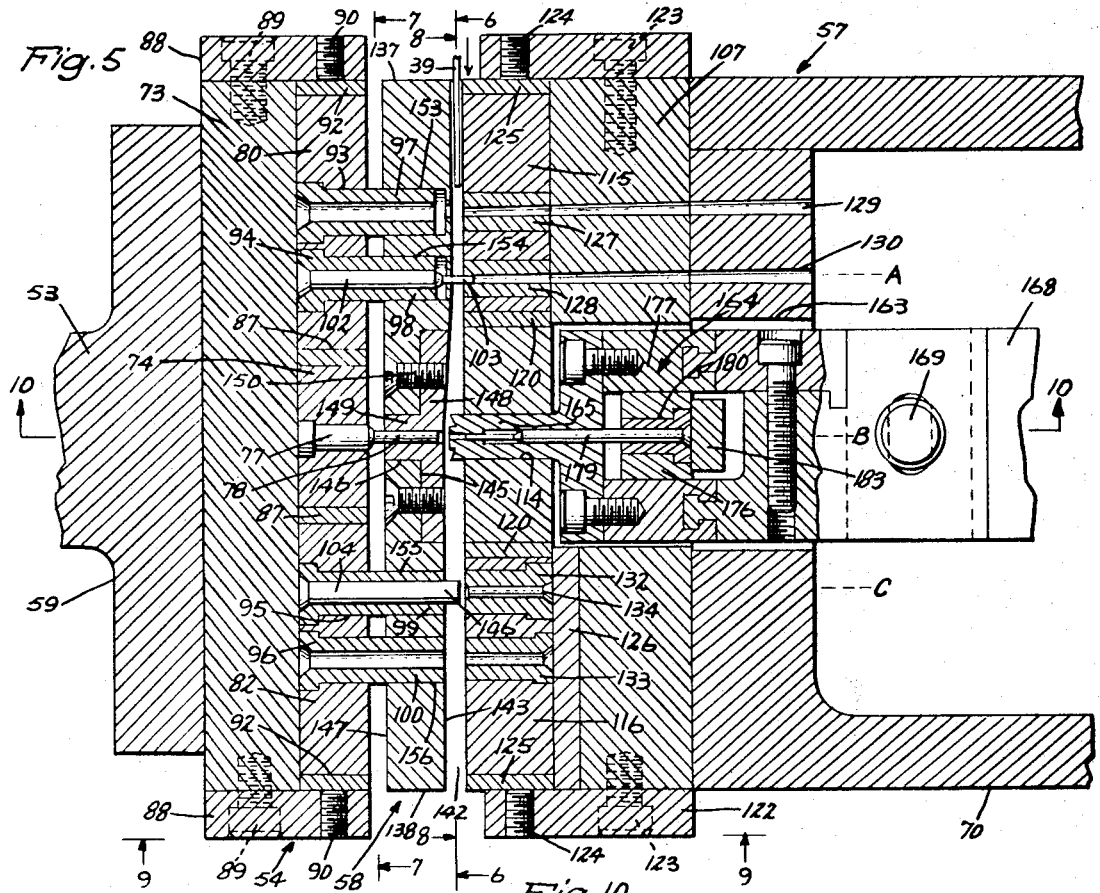
FIG. 5 is an enlarged, fragmentary, cross-sectional view taken along the line 5—5 of FIG. 4 and showing details of the contact-forming and attaching mechanism of the invention.
Figure 10:
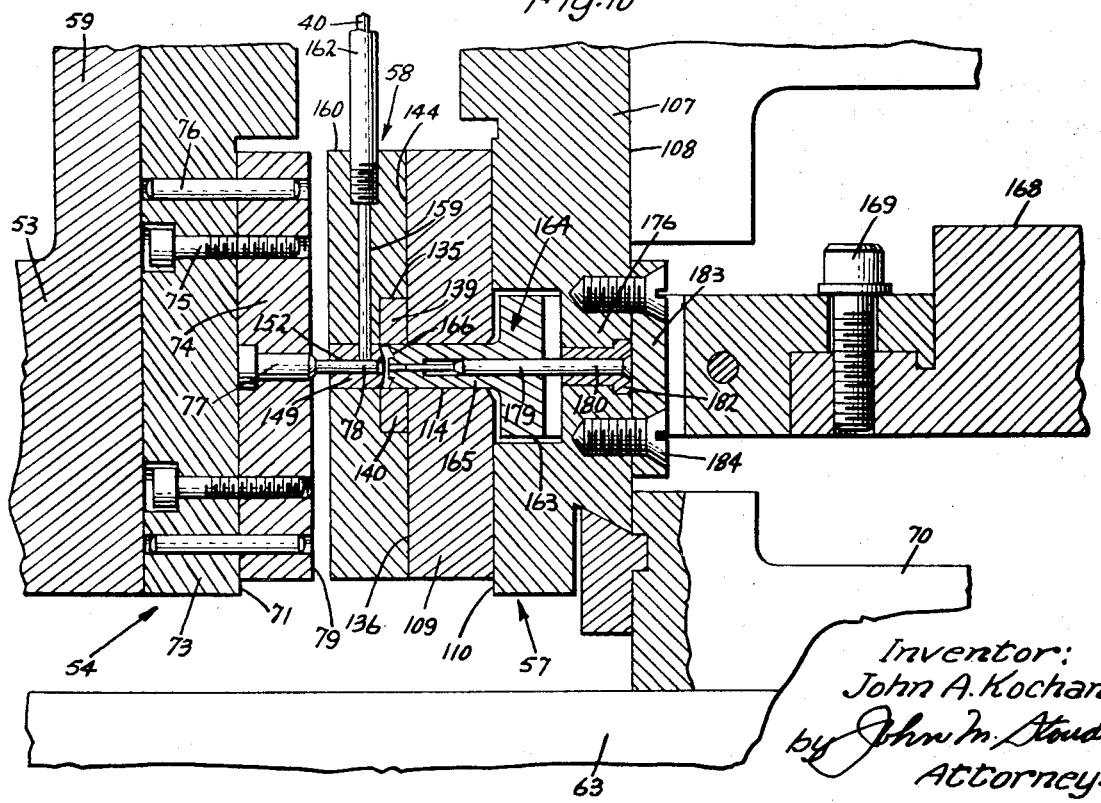
FIG. 10 is a fragmentary, cross-sectional view taken along the line 10—10 of FIG. 5.

Referring now momentarily to FIG. 2, there is shown an electrically conductive switch element, generally indicated at 30, which is representative of the type of elements capable of rapid automatic fabrication by the apparatus and method of the present invention. Switch element 30 is of the single-headed contact and "pressure lock" terminal type disclosed in U.S. Pat. No. 3,249,725 issued on May 3, 1966 to Philip Hutt et al. and assigned to the assignee of the present invention. Switch element 30 comprises a metal blade 31, preferably formed of relatively thin strip spring material such as Phosphor bronze, having a generally U-shaped terminal section 32 integrally joined to a contact-mounting section 33 having a single-head contact 34 attached thereto. Contact 34 which is preferably formed of silver has an enlarged, cylindrical contact element 35 having a flat contact surface, contact element 35 being firmly attached to contact-mounting section 33 by a shank portion 36 which extends through a suitable hole 37 pierced in section 33 and which is sized or headed at 38 on the bottom side of section 33.

Referring now particularly to FIGS. 1 through 24 of the drawings, there is shown a specific embodiment of the apparatus of the invention by which switch elements 30 are continuously and automatically fabricated from a continuous length of relatively thin conductive strip metal 39 and a continuous length 40 of contact-forming metal in the form of rod or wire. The strip material 39 is wound on a storage drum 42 which is freely rotatably mounted on an upright stand assembly 43. Strip 39 is removed from drum 42 and intermittently advanced through the apparatus of the invention by conventional feeding apparatus 43a which draws the strip 39 through conventional straightening apparatus 41 as it leaves the drum 42. Feeding apparatus 43a, along with the other mechanism of the invention, is driven by a suitable drive motor 44 through gearing 45, 46.

Contact-forming wire 40 is wound on a storage drum freely rotatably mounted on support 48 mounted on frame element 49. Wire 40 is intermittently advanced to the contact-forming and attaching mechanism 50 by a conventional feeding mechanism 52. Feeding mechanism 52 is actuated in response to lateral movement of slide 53 and punch block assembly 54 through cooperative engagement of a roller 55 and cam surface 56 mounted on the punch block assembly 54.

The contact-forming and attaching mechanism 50, which performs the piercing, extruding and heading operations at positions A, B, and C as will be hereinafter described in detail, comprises movable punch block assembly 54, stationary die block assembly 57 and stripper plate 58 disposed between the punch block 54 and the die block 57. Punch block assembly 54 is mounted on flange portion 59 formed at one end of the slide 53. Slide 53 is supported for lateral movement in the direction shown by the arrows 60 by means of suitable ways 62 mounted on bed 63. The other end 64 of slide 53 has a roller 65 mounted thereon which cooperatively engages cam 66 mounted on shaft 67. Shaft 67 and cam 66 are driven by the driving motor 44 through gears 45, 68, thereby to positively move punch block assembly 54 transversely between its retracted and forward positions through an intermediate position, as will be hereinafter more fully described. Punch block assembly 54 is removably attached to flange 59 by means of suitable bolts 69 for a purpose to be hereinafter described. The fixed die block assembly 57 is removably secured to support 70 which in turn is secured to the bed 63. Frame 49 which supports both the wire storage drum 47 and the feed mechanism 52 is secured to the fixed die block assembly 57 by means of suitable bolts 72.

Referring now particularly to FIGS. 5 through 10 inclusive, the punch block assembly 54 comprises a base plate 73 having its outer surface abutting flange portion 59 on the slide 53 and secured thereto by the bolts 69. A center punch holder 74 abuts the inner surface 71 of the base plate 73 and is removably secured thereto by means of suitable cap screws and pins 75, 76. Contact-forming pin 77 is supported in punch holder 74 and has a distal end 78 projecting forwardly from the front surface 79 of the punch holder 74. A pair of punch holders 80, 82 is mounted on the front surface 71 of the base plate 73 being removably secured thereto by means of blocks 83 and cover plates 84 secured to base plate 73 by suitable cap screws and pins 85, 86. Punch holders 80, 82 are axially positioned by means of shims 87 and are retained by means of end plates 88 secured to base plate 73 by suitable cap screws 89. Suitable set screws 90 in the plates 88 engage shims 92 and in turn maintain the punch holders 80, 82 in engagement with shims 87.

Punch bushings 93, 94 and 95, 96 are secured in the punch holders 80, 82 and have portions 97, 98, 99, 100 extending forwardly from the front surface of the punch block assembly 54. A piercing punch 102 is removably positioned in punch bushing 94 and has punch end 103 extending forwardly therefrom. Piercing punch 102 may alternatively be mounted in punch bushing 93 in the event that the apparatus is employed for fabricating switch elements having a different length. Heading punch 104 is secured in punch bushing 95 and has end 106 extending forwardly therefrom. Heading punch 104 may alternatively be mounted in punch bushing 100 when punch 102 is mounted in bushing 93.

Stationary die holder assembly 57 comprises a base plate 107 having its rear surface 108 abutting mounting member 70 and frame 49. A center plate 109 abuts the forward surface 110 of the base plate 107 and is secured thereto by means of suitable cap screws and pins 112, 113. Plate 109 has a center opening 114 formed therein. A pair of die plates or holders 115, 116 is arranged abutting the forward surface 110 of the base plate 107 being retained in position by blocks 117 which are secured to base plate 107 by suitable cap screws and pins 118, 119. Die holders 115, 116 are positioned axially by means of suitable shims 120 and are held in position by means of end plates 122 secured to the base plate 107 by suitable cap screws 123. Suitable set screws 124 in the end plates 122 engage shims 125 thereby forcing the die holders 115, 116 against the shims 120. A rear shim 126 is provided underlying die holder 116.

Die bushings 127, 128 are seated in die holder 115 respectively in alignment with punch bushings 97, 98. Openings 129, 130 are formed in base plate 107 and mounting member 70 respectively communicating with the die bushings 127, 128 for accommodating the punchings resulting from the piercing action of end 103 of punch 102 in cooperation with die bushing 128. Heading die bushings 132, 133 are mounted in die holder 116 respectively in alignment with the punch bushings 95, 96. Heading die 134 is seated in the heading die bushing 132 and may alternatively be seated in heading die bushing 133 if the heading punch 104 is seated in the heading punch bushing 96.

Stripper plate 58 has a longitudinal groove 135 formed in its front surface 136, groove 135 extending longitudinally between opposite ends 137, 138 of the stripper plate 58 and communicating therewith. Elongated blocks 139, 140 are secured in the groove 135 thereby defining slot 142 therebetween which extends longitudinally between and communicates with ends 137, 138. Reference to FIG. 5 will reveal that the bottom surface 143 of slot 142 tapers from end 137 to end 138 so that the slot 142 is deeper adjacent end 138 than adjacent end 137. Stripper plate 58 is positioned with its front surface 136 abutting the front surface 144 of the stationary die block assembly 57.

A recess 145 is formed in the bottom 143 of the slot 142 and a center opening 146 communicates between the rear surface 147 of the stripper plate 58 and the recess 145. A contact element forming block 148 is seated in recess 145 and has a portion 149 seated in the opening 146, block 148 being secured to the stripper plate 58 by means of suitable screws 150. Opening 152 extends through block 148 into which end 78 of punch 77 extends.

Stripper plate 58 has openings 153, 154, 155, 156 which slidably receive the punch bushing extension portions 97, 98, 99 and 100. Openings 153, 154 are partially closed to define smaller openings 157, 158 through which end 103 of piercing punch 102 extends.

An opening 159 extends upwardly in the stripper plate 58 communicating between opening 152 in block 148 and the upper side 160 of the stripper plate. A conduit 162 extends between opening 159 and the feeding mechanism 52. Contact-forming wire 40 extends downwardly through conduit 162 and opening 159 into the opening 152 as best seen in FIGS. 11, 12 and 16.

An opening 163 is formed in the base plate 107 and mounting member 70 and opening 114 in the die holder 109 communicates between slot 142 and opening 163. A movable die 164 is provided in the opening 163 and has a plunger portion 165 extending forwardly in the opening 114 with its end 166 exposed to the slot 142. Movable die 164 is moved forwardly and rearwardly in the directions shown by the arrows 167 (FIG. 2) by means of slide 168 having its inner end secured to the movable die 164 by bolt 169 and having its outer end connected to lever member 170 pivotally mounted on frame 49 as at 172. Lever member 170 carries a roller 173 which cooperates with a cam 174 on shaft 175. Shaft 175 and cam 174 are driven by drive motor 44 through gears 45 thereby positively to move the movable die 164 between retracted and forward positions as will be hereinafter described.

Base plate 107 has a vertical portion 176 extending upwardly in the opening 163 and movable die 164 has a clevis portion 177 which straddles portion 176. Plunger portion 165 of movable die member 164 has a center opening 178 formed therethrough communicating with end 166. A stationary stripping pin 179 is seated in opening 178 with its rear end 180 seated in bushing 182 which is in turn seated in portion 176 in base plate 107. A cover plate 183 secured to base plate 107 by suitable screws 184 retains the stripping pin 179 in position. Stripping pin 179 has a distal end 185 which is exposed to the slot 142.

As will now be described, the piercing punch 102, 103 and its cooperating die 128 are positioned at piercing station A, the contact element forming punch 77, 78 and its cooperating movable die 164, 165 are positioned at station B, and the heading punch 104, 106 and is cooperating heading die 134 are positioned at station C, stations A and C being spaced by equal distances on opposite sides of station B. Feeding mechanism 43a intermittently advances strip 39 into and through slot 142, each advance being a distance equal to the spacing of stations A and C from station B. It will be readily understood that cams 66, 174 and gearing 45, 46, 68 are proportioned and arranged to actuate feeding mechanism 43a to provide this advance and to actuate punch block 54 and movable die 164 to provide the sequence of operations being described.

Referring now specifically to FIGS. 11 through 17, the end of strip 39 is initially fed into the slot 142 and thereby exposed to piercing punch 102, 103, the advance of strip 39 then being arrested. Slide 53 and punch block 54 are then actuated by cam 66 from their retracted position to their forward position, as shown in FIGS. 5, 9, 10 and 17, with punch end 103 thus piercing strip 39 to form hole 37 in strip 39. Continued rotation of cam 66 retracts slide 53 and punch block assembly 54 to their retracted positions at which time feeding mechanism 43a is actuated to advance strip 39 a distance or pitch equal to the distance between stations A and B thereby advancing hole 37 to station B in alignment with opening 152 in the stripper plate and opening 178 in the movable die 164. The advance of strip 39 is then again arrested and at this instant, cam 174 has fully retracted the movable die 164, 165 with the contact element forming punch 77, 78 likewise being fully retracted by cam 66 as seen in FIG. 11. In this position, the distal end 185 of stripping pin 179 is generally flush with the end 166 of plunger portion 165 of movable die 164.

While cam 66 continues on a dwell portion, continued rotation of cam 174 moves the movable die 164, 165 forwardly so that end 166 engages one side of strip 39 thereby clamping the other side against end 187 of the portion 149 of the plug member 148. This forward movement of movable die 164, 165 results in withdrawal of the stripping pin 175 in opening 178 so that the end 185 defines a recess 188. It will be observed that at this instant end 78 of the punch 77 is withdrawn in the opening 152 from the end 187 of the plug member 148 thereby defining a recess 189 into which end 190 of the contact forming wire 40 extends.

Forward movement of the movable die 164, 165 is now arrested and continued rotation of cam 66 now moves slide 53 and punch block assembly 54 forwardly so that punch 77, 78 moves forwardly in opening 152 to an intermediate position as shown in FIG. 13. This forward movement of end 78 of punch 77 cuts off the end 190 of wire 40 thereby forming a slug of contact-forming metal which is partially extruded through the hole 37 into the recess 188 of the stripping pin opening 178, the remaining portion of this slug being deformed in the now-shortened recess 189 to fill the recess thus forming the contact element 35, the extruded portion which extends through hole 37 and into the recess 188 forming the shank portion 36 of the contact 34. It will be observed that the end 78 of the punch 77 is slightly dished inwardly, as at 191, to facilitate the cutting-off and extruding operations.

Forward movement of punch 77, 78 is now momentarily arrested while continued rotation of cam 174 now retracts the movable die 164, 165 to its retracted position, as shown in FIG. 14.

The retractive movement of the movable die 164, 165 is now arrested and a second rise portion on cam 66 now moves slide 53 and the punch block 54 forwardly a small additional amount from the intermediate position of FIGS. 13 and 14 to the forwardmost position of FIG. 15 in which end 78 moves forwardly to strip the contact element 35 from the recess 189 at the end of opening 152, thereby freeing the contact element 35 from the opening, as shown in FIG. 15.

It will be observed that forward movement of slide 53 and punch block assembly 54 to its intermediate position thereby to form the contact element 35 and extrude the shank portion 36 through the opening 186 in strip 39 simultaneously caused forward movement of piercing punch 102, 103 to pierce the next successive hole 37 in strip 39.

Continued rotation of cam 66 now results in retraction of slide 53 and punch block assembly 54 to their fully retracted positions thereby retracting punch 77, 78 to its retracted position as shown in FIG. 16, feeding mechanism 52 being actuated by this retractive movement of punch block assembly 54 through the cooperation of roller 55 and cam surface 56 to advance wire 140 downwardly so that end 190 moves into the recess 189 in front of punch end 78. The feeding mechanism 43a is now again actuated to advance strip 39 an equal distance between stations A and B, and B and C, thereby moving the now formed contact element 35 with its extruded shank 36 extending through hole 37 to the heading position C, the next successive strip hole 37 simultaneously being moved to position B, as again shown in FIG. 11.

Referring now to FIG. 18 in which the mechanism at the heading station C is shown in detail with strip 39 being advanced from station B to station C, contact element 35 will now be in alignment with the heading punch 104, 106 and the heading die 134. Therefore, when the slide 53 and punch block assembly 54 are next actuated from their retracted to their forward positions by cam 66, heading punch 104 will be moved forwardly so that its end 106 engages contact element 35 thereby forcing the extruded shank 36 against the heading die 134 to strike or head the same at 38 thereby firmly to attach a contact element 35 to the strip 39. It will be understood that during this attaching of a contact element 35 to strip 39, another contact element 35 is simultaneously extruded in the next successive hole 37 at station B and yet another hole 37 is pierced at station A.

Momentary reference to FIG. 24 will now reveal that each cycle of operation of the punch block assembly 54, movable die 164, 165 and the feeding mechanisms 43a, 52 results in incremental advance of the strip 39 in the direction shown by the arrow 192 and in the sequential formation of a row of holes 37 at station A longitudinally spaced apart by a pitch or distance 193, the extruding of contact elements 35 in the holes at station B and the heading of the contact elements at station C.

Referring now to FIGS. 1 and 22, a notching punch and die assembly 194 is provided at station D for forming notches 195 in the side edges of strip 39. Notching punch and die assembly 194 comprises a stationary notching die block 196 having notching dies 197 secured therein and a movable notching punch 198. Notching punch 198 is guided for transverse movement with respect to the strip 39 by suitable ways 199 on the bed 63. Notching punch 198 is actuated by means of slide 200 connected by roller 202 to cam 203 on shaft 175. Thus, each rotation of cam 203 in response to one revolution of shaft 175 actuates notching punch 198 to form the notches 195 adjacent strip 39. It will be understood that the notching operation at station D is performed concurrently with the piercing-extruding and heading operations at stations A, B and C while the strip 39 is held stationary. Thus, when the punch block assembly 54 and the movable die assembly 164, 165 are returned to their retracted positions, the notching punch 198 is returned to its retracted position and the strip 39 is advanced another pitch 193 as above-described.

Referring now to FIGS. 1 and 23, a cut-off punch and the die 204, 205 are provided at station E for severing the strip 39 between each contact 34 as shown in FIG. 22 by the dashed line 206. Cut-off die 205 is mounted on bed 63 while cut-off punch 204 is mounted for transverse sliding movement on bed 63. Cut-off punch 204 is actuated by slide 206 connected by roller 208 to cam 207 on shaft 175. Thus, cut-off punch 204 is actuated in response to each complete revolution of cam 207 to sever strip 39 along line 206 thereby to provide the individual blade elements 31 each having a contact 34 attached thereto. It will again be understood that the severing operation at position E is performed concurrently with the piercing, extruding, heading and notching operations performed at stations A, B, C and D.

The advance of strip 39 for pitch 193 immediately prior to the cut-off operation at station E has positioned segment 31 at the forming station F. Referring still to FIGS. 1 and 23, stationary forming die member 209 and movable forming die members 210, 212 and 213 are provided. Segment 31 in its initially flat form is advanced to a position resting on the surface 214 of the stationary forming die 209. Movable forming die member 210 is then actuated to move toward the stationary die member 209 as shown by the arrow 215 so that its portion 216 engages segment 31 thus forming bend 217 in section 32. Movable forming die member 213 is then actuated to move longitudinally in the direction shown by the arrow 218 to form with the bend 219 and movable forming die member 212 is actuated to move longitudinally in the opposite direction 220 to form the indentation 222 in section 32 of blade segment 31. Forward movement of the movable forming die member 210 in direction 215 thereby to form the bend 217 depresses stripping pin 223 against spring 224. Movable die members 210, 212 and 213 are actuated by slides, as indicated by dashed line 221, which in turn are actuated by cam 225 on shaft 175, the forming operation following immediately after the severing operation and while the strip 39 is stationary. Movable forming die members 210, 212 and 213 are then retracted by cam 225 as the punch block assembly 54, movable die assembly 164, 165, movable notching die 198 and the cut-off punch 204 are retracted, stripping pin 223 under the influence of spring 224 thus ejecting bend 217 of the blade segment 31 from notch 226 in the stationary forming die 209 with the result that the completed switch blade element 30 having contact 34 attached thereto is released from the forming die assembly, as shown in FIG. 1. Feeding mechanism 43a then again advances strip 39 thus moving the next successive segment into the cut-off and forming die apparatus at stations E and F.

Referring now to FIG. 25, there is shown a different type of switch blade element 228 comprising a blade element 229 having a double-headed contact 230 attached thereto which may also be manufactured by the apparatus and method of the present invention. Blade element 229 is formed of an end terminal section 232 joined by a bend 233 to a section 234 which in turn is joined by a reverse U-shaped bend 235 to section 236. Section 236 is joined to end 237 by bend 241. Contact 230 is attached to blade end 237 and comprises enlarged contact elements 238, 239 on opposite sides of the blade end 237 joined by extruded shank portion 240 which extends through the opening 37 in the blade element 229.

The switch blade element 229 is again formed from an elongated strip 39 of electrically conductive strip material and the apparatus and method for forming and attaching the contact 230 is essentially identical to that illustrated and described in connection with FIGS. 1 through 24, inclusive, differing specifically only in the pitch of the advance of strip 39 provided by the feeding mechanism 43a, the spacing of the piercing, extruding and forming heading stations A, B and C, and the particular configuration of the heading, notching and forming assemblies at stations D, E and F. It will be observed that the alternative piercing punch and die locations 93, 127 and heading punch and die locations 100, 133 may be employed for the piercing, extruding and heading operations in the fabrication of the switch element 228 which includes blade element 229 which is somewhat longer than the blade element 31 of the switch element of FIG. 2.

The piercing and extruding operations involved in the fabrication of the switch element 228 are identical to those previously described, a row of holes 37 being sequentially formed in strip 39 and the slug 190 cut from the wire 40 being extruded by end 78 of punch 77 thereby to form contact element 238 and to extrude the shank 240 through the hole 37. However, at the heading station C, a larger heading die pin 242 is provided seated in bushing 243 in the die holder 116 of the stationary die assembly 57 and having an end 244 proportioned to head the extruded shank to form the contact element 239, as shown in FIG. 26.

The notching punch die assembly 194 is also modified to punch the notches 245 in the side edges of the strip 39 and is also suitably moved longitudinally to accommodate the longer pitch of movement of the strip 39.

Referring now to FIG. 27, the forming punch and die assembly is also modified to form the more complex configuration of the blade element 229. Thus, stationary forming die 245 is provided onto which the blade element 229 is advanced immediately prior to severing by the cut-off punch and die assembly at station E. Movable forming die members 246, 247 are then actuated forwardly in the direction shown by the arrows 248, 249 thereby to form the U-shaped bend 235 and the bend 241, and movable forming die members 250, 252 are actuated longitudinally in the direction shown by the arrows 253, 254 thereby to form the bend 233 and the indentation 222. Movable die members 246, 247, 250 and 252 are then retracted and the finished switch element 228 ejected by means of the stripping pin 223 under the influence of spring 224. Thus, with only minor modifications, the method and apparatus of my invention is capable of providing switch elements of different constructions both efficiently and economically.

It will now be seen that the improved apparatus and method of the invention continuously, automatically and at a high rate of speed performs all of the operations required for the fabrication of finished electrically conductive blade elements having terminals attached thereto. Since multi-slide stamping apparatus is employed for performing all of the operations rather than conventional apparatus of the punch press type, the springs employed in punch press apparatus with their disadvantages are eliminated. It is further seen that the apparatus and method is characterized by its versatility since a wide variety of configurations of elements can be provided by the simple replacement and location of the piercing, heading, notching, severing and forming punch and die assemblies. It will also be observed that in the case of elements having single headed contacts, the location of the enlarged contact element can readily be changed from one side of the strip to the other by merely reversing all components of the illustrated apparatus associated with stations A, B, and C with respect to the longitudinal path of travel for strip 39. Such reversal includes mechanism 50 with its punch block, die block and stripper plate assemblies 54, 57, 58 as well as the associated slides 53, 168, cams 66, 174, feeding mechanism 52, and related parts.

While there have been described above the principles of this invention in connection with specific apparatus and method, it is to be clearly understood that this description is made only by way of example and not as a limitation to the scope of the invention. It will thus be obvious to those skilled in the art that various changes and modifications may be made therein without departing from the true spirit and scope of the invention, and it is therefore aimed in the appended claims to cover all such equivalent variations as fall within the invention.

What I claim as new and desire to secure by Letters Patent of the United States is:

1. Apparatus for forming electrically conductive elements comprising: a die block; a stripper plate in juxtaposed relationship with said die block to form therebetween a cavity for receiving a strip of relatively thin conductive material having a hole therein; said die block and stripper plate being positioned apart a distance substantially greater than the thickness of the strip of metal; a die movably mounted in said die block; means for moving said die between a retracted and a forward position; said die, in its forward position extending into said cavity to clamp the portion of the strip adjacent the hole therein between said die and said stripper plate; said die, in its retracted position being spaced substantially from said stripper plate to release the strip; said die having a first longitudinal opening therein; said first longitudinal opening being in alignment with the hole in the strip when said die clamps the strip; a stationary stripping pin mounted in said first longitudinal opening; said stripping pin being withdrawn away from the cavity end of said die when said die is in its forward position and being substantially flush with said cavity end of said die when said die is in its retracted position; said stripper plate having a second longitudinal opening therein; said second longitudinal opening being in alignment with the hole in the strip where said die clamps the strip and having a larger cross-sectional area than the hole in the strip; a plunger movably mounted in said second longitudinal opening; means for moving said plunger between a retracted position, removed substantially from the cavity end of said second longitudinal opening, an intermediate position, spaced slightly from said cavity end of said second longitudinal opening, and a forward position, at least in alignment with said cavity end of said second longitudinal opening; means for introducing a slug of contact-forming material into said second longitudinal opening when said plunger is in its retracted position; and means interconnecting said die moving means and said plunger moving means whereby said die is moved to its forward position to clamp the strip, said plunger is moved from its retracted to its intermediate position to form a contact adjacent one side of the strip and to extrude some contact-forming material through the hole in the strip into said first longitudinal opening, then said die is moved to its retracted position and said plunger is moved to its forward position so that said stripper pin removes the extruded contact-forming material from said first longitudinal opening and said plunger removes the contact from said second longitudinal opening.

2. The invention as set forth in claim 1 wherein the contact-forming material is in the form of a length of material sufficient for a plurality of contacts; said material introducing means being constructed to introduce an amount of material into said second longitudinal cavity sufficient to form one contact when said plunger is in its retracted position and said plunger being formed to sever said amount of material from the length of material as said plunger moves from its retracted to its intermediate position.

3. The invention as set forth in claim 1 wherein said die and plunger are at a work station of said apparatus; said apparatus including a punching station spaced ahead of said work station and having cooperative die and punch means for forming the hole in the strip.

4. The invention as set forth in claim 1 wherein said die and plunger are at a work station of said apparatus; said apparatus including a heading station spaced after said work station and having means for heading the extruded contact-forming material into engagement with the strip opposite the contact to firmly attach the contact-forming material to the strip.

5. The invention as set forth in claim 4 wherein said apparatus includes means spaced after said heading station for forming the strip into a desired contact element shape.

6. The invention as set forth in claim 1 in which the strip of conductive material is of a length to form a plurality of contact elements; said apparatus including means for intermittently advancing successive portions of the strip into said cavity with successive holes in the strip being sequentially brought into alignment with said first and second longitudinal openings.

7. The invention as set forth in claim 6 wherein the contact-forming material is in the form of a length of material sufficient for a plurality of contacts; said material introducing means being constructed to introduce an amount of material into said second longitudinal cavity sufficient to form one contact when said plunger is in its retracted position and said plunger being formed to sever said amount of material from the length of contact-forming material as said plunger moves from its retracted to its intermediate position.

8. The invention as set forth in claim 6 wherein said die and plunger are at a work station of said apparatus; said apparatus including a punching station spaced ahead of said work station and having cooperating die and punch means for forming successive holes in the strip; said strip moving means being formed to intermittently advance the strip through the apparatus with each advance being equal to the spacing between said work station and said punching station.

9. The invention as set forth in claim 8 wherein said apparatus further includes a heading station spaced after said work station a distance equal to the spacing between said work station and said punching station and having means for heading the extruded contact-forming material into engagement with the strip opposite the contact to firmly attach the contact-forming material to the strip.

10. The invention as set forth in claim 9 wherein said apparatus further includes means spaced after said heading station for severing the strip into successive lengths, each length of strip having at least one contact attached thereto, and forming each length of strip into a contact element of the desired shape.

11. The invention as set forth in claim 9 wherein the contact-forming material is in the form of a length of material sufficient for a plurality of contacts; said material introducing means being constructed to introduce an amount of material into said second longitudinal cavity sufficient to form one contact when said plunger is in its retracted position and said plunger being formed to sever said amount of material from the length of material as said plunger moves from its retracted to its intermediate position.

References Cited

UNITED STATES PATENTS

| 3,034,641 | 5/1962 | Kochan | 29—566 X |
| 3,110,201 | 11/1963 | Fuskik | 29—33.8 X |
| 3,377,700 | 4/1968 | Cooley | 29—509 X |

ANDREW R. JUHASZ, Primary Examiner

Z. R. BILINSKY, Assistant Examiner

U.S. Cl. X.R.

29—630